(12) United States Patent
Kelly

(10) Patent No.: US 7,077,740 B2
(45) Date of Patent: Jul. 18, 2006

(54) PAINT SPRAY BOOTH

(75) Inventor: Craig J. Kelly, Livonia, MI (US)

(73) Assignee: TI Technologies, LLC, Detroit, MI (US)

( * ) Notice: Subject to any disclaimer, the term of this patent is extended or adjusted under 35 U.S.C. 154(b) by 0 days.

(21) Appl. No.: 11/046,409

(22) Filed: Jan. 28, 2005

(65) Prior Publication Data

US 2005/0170768 A1 Aug. 4, 2005

Related U.S. Application Data

(60) Provisional application No. 60/548,053, filed on Feb. 26, 2004, provisional application No. 60/540,401, filed on Jan. 30, 2004.

(51) Int. Cl.
*B05B 15/12* (2006.01)

(52) U.S. Cl. .............. 454/53; 454/51; 454/50

(58) Field of Classification Search ............... 454/50, 454/53; 118/326; 427/421, 424
See application file for complete search history.

(56) References Cited

U.S. PATENT DOCUMENTS

| | | | | |
|---|---|---|---|---|
| 3,932,151 A | * | 1/1976 | Lau .............. | 96/325 |
| 4,328,012 A | * | 5/1982 | Telchuk et al. ........... | 95/217 |
| 4,399,742 A | * | 8/1983 | Dobias .............. | 454/55 |
| 4,515,073 A | * | 5/1985 | Dorsch et al. ............ | 454/55 |
| 4,530,274 A | * | 7/1985 | Lyons et al. ............ | 454/53 |
| 4,537,120 A | * | 8/1985 | Josefsson .............. | 454/52 |
| 4,704,952 A | * | 11/1987 | Johnson et al. ......... | 454/54 |
| 4,874,412 A | * | 10/1989 | Nowack .............. | 55/385.1 |
| 4,910,047 A | * | 3/1990 | Barnett et al. ......... | 427/195 |
| 6,010,571 A | * | 1/2000 | Josefsson et al. ...... | 118/326 |
| 6,565,625 B1 | * | 5/2003 | Hearld .............. | 95/14 |
| 6,723,145 B1 | * | 4/2004 | Cole .............. | 55/342 |
| 6,723,169 B1 | * | 4/2004 | Hihn et al. ........... | 118/309 |

* cited by examiner

Primary Examiner—Derek S. Boles
(74) Attorney, Agent, or Firm—L. C. Begin and Associates, PLLC

(57) ABSTRACT

A paint spray booth is provided containing a plenum packed with a contact material for treatment of paint overspray generated during operation of the paint spray booth. The contact material is packed to provide a relatively large surface area and a relatively large interstitial area defined by the contact material. As paint overspray and bulk fluid is drained and channeled through the plenum, contact efficiency between the bulk fluid and the overspray is maximized. Paint overspray is thereby effectively detackified.

10 Claims, 2 Drawing Sheets

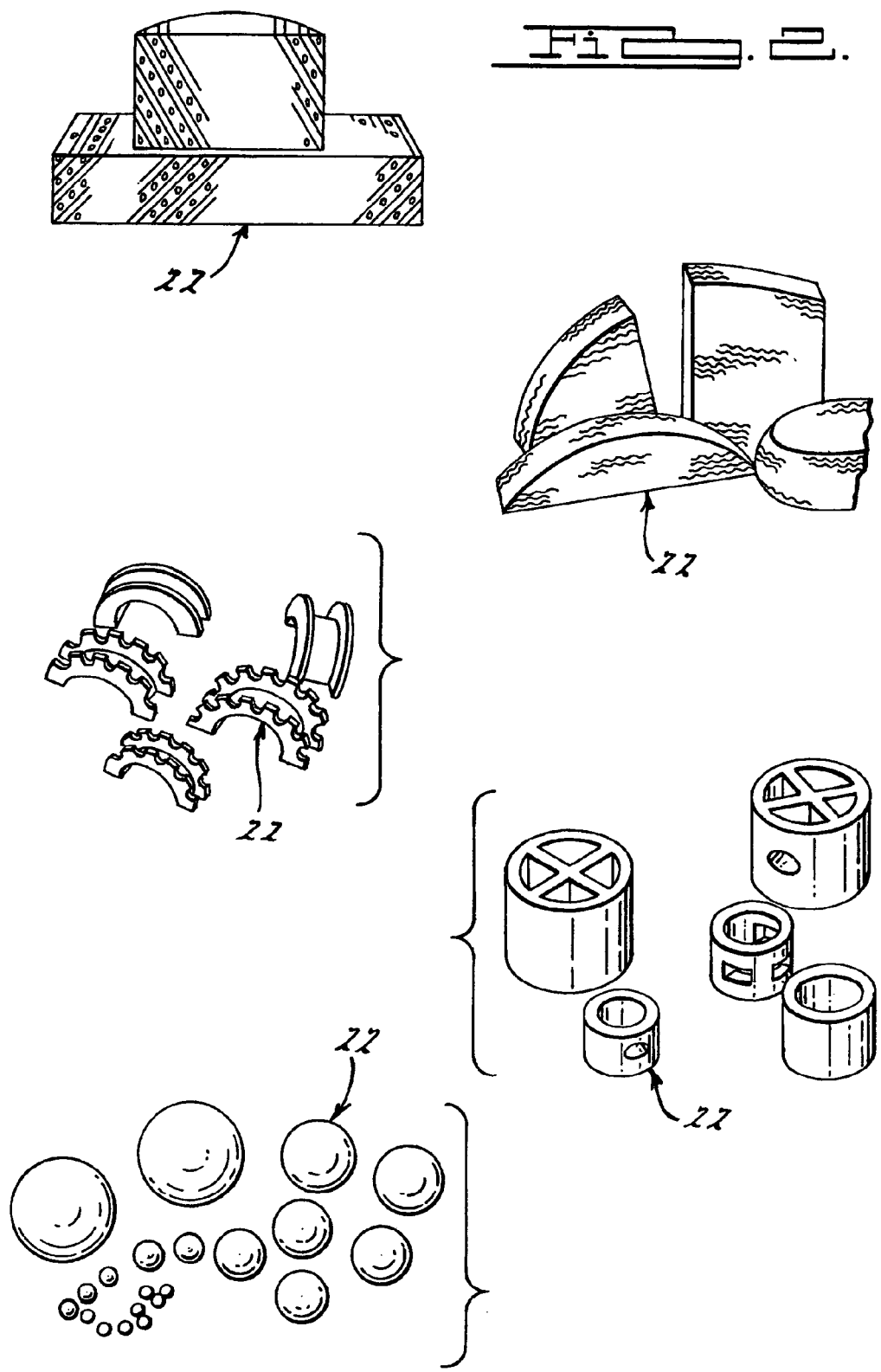

PAINT SPRAY BOOTH

CROSS-REFERENCE TO RELATED APPLICATIONS

This application claims the benefit of Provisional Patent Application Ser. No. 60/540,401, filed on Jan. 30, 2004 and Provisional Patent Application Ser. No. 60/548,053, filed on Feb. 26, 2004.

BACKGROUND OF THE INVENTION

The present invention relates generally to a wet scrubber which captures and scrubs liquid or solid particles contained in an airflow, and also to a paint spray booth comprising the wet scrubber capable of capturing and scrubbing paint particles contained in a contaminated airflow discharged from the spray booth.

Description of the Related Art

Typically, painting of various kinds of mass-produced products such as car bodies and parts is carried out in a paint spray booth, in which an object to be painted is sprayed with the paint utilizing spray painting equipment. Paint that does not stick to the object to be painted floats in the air as paint mist. During the operation of such paint spray booths, it is necessary to supply continuously fresh outside air to, and to remove the paint mist from, the working area by means of a discharge air managing system. These serve the purposes of maintaining a safe and healthy working environment and assuring the highest quality of paint finish. The paint particles contained in this discharge air must be captured before the airflow exits to the atmosphere to avoid environmental pollution.

Known methods for separating paint mist from the air exhaust stream include: i) a dry method in which the contaminated airflow is made to pass through a dry filter or screen and the paint particles contained therein are adsorbed or trapped by the filter or the like; and ii) a wet method in which the contaminated airflow is put in contact with and mixed with a liquid, such as water, such that the paint particles contained therein are captured and scrubbed by the liquid. Conventionally, in a paint spray facility for painting large products such as cars, the wet method is adopted.

There are various kinds of wet methods for separating paint mist. Typically, methods such as those described below are employed:

1. A method in which, utilizing gravity difference between the airflow and the liquid such as water, the airflow is made to pass through the bulk liquid to capture paint particles contained in the airflow;
2. A method in which the liquid such as water is made to spill downwardly, and the airflow is made to pass through a liquid film formed thereby, to capture in the film paint particles contained in the airflow;
3. A method in which the liquid such as water is sprayed to create a large population of liquid drops and the contaminated airflow is made to pass through this liquid mist where the liquid drops contact and capture the paint particles to be removed;
4. A method in which the airflow and the liquid such as water are made to pass through a restriction called a venturi. The turbulence of high-velocity air in the venturi causes break-up of the liquid into small drops that intercept and coalesce with the entrained paint particles; and
5. A method in which the liquid such as water is made to flow downwardly on a plate or the like and the airflow is made to blow on the plate, or, the airflow is made to impinge upon a pool of liquid such as water. The paint particles contained in the air stream having greater momentum impact and are trapped on the surface of the liquid.

Typically, a discharge airflow from a paint spray booth consists of an airflow containing a paint mist that includes paint particles of various diameters. The diameters of these paint particles range from several hundred sum to less than 1 μm. In a typical paint mist, there are more small paint particles than large paint particles.

In conventional wet scrubbers used with a paint spray booth of a car assembly plant, various attempts have been made to improve scrubbing efficiency by increasing the frequency and the speed of the impacts of the discharge air stream flowing from the spray section against a capturing water flow. Increased energy costs and increased maintenance costs are often associated with such systems. Related thereto, U.S. Pat. Nos. 5,074,238, 5,040,482, 4,700,615, 4,664,060, 4,220,078, and the like disclose various proposals. U.S. Pat. No. 5,074,238 discloses a scrubber having a venturi opening through which a discharge airflow and water pass and a curved baffle where air and water mix. U.S. Pat. No. 5,040,482 discloses a scrubber having two troughs, which supply a sheet of water along an inclined surface and baffle to intermix the water and paint-laden air. U.S. Pat. No. 4,700,615 discloses a scrubber in which several pools are provided hierarchically such that water runs through the pools in sequence, and a discharge airflow is made to pass through the plurality of water curtains that are formed. U.S. Pat. No. 4,664,060 discloses a scrubber in which a lip is provided in the rectangular venturi to increase the intermixing of the air and water, and a baffle plate is disposed below the venturi throat. U.S. Pat. No. 4,220,078 discloses a scrubber with a V-shaped impingement member disposed in the path of a discharge air-flow, and a shroud is provided around the collision to effect further scrubbing.

It has been found that attempts to scrub paint particles more efficiently tend to cause increased processing noise. Also, the necessity of increasing the capacity of an exhaust air fan or the like tends to increase equipment cost and energy consumption. Therefore, a device is needed that not only improves efficiency but also reduces noise and energy consumption as much as possible. Reduction of noise is desired from the standpoint of improving the working environment of an operator. U.S. Pat. No. 5,100,442 discloses a scrubber in which a discharge airflow and a water flow are directed into a venturi. Then, they are introduced into a restriction that defines a noise barrier that prevents noise caused by turbulent mixing to pass upstream. U.S. Pat. No. 5,020,470 discloses a scrubber having an elongated discharge tube through which discharge air and water flow. Particulate is removed by virtue of impact of the airflow with an impact pool. Little or no water dispersal or atomization occurs near the top of the discharge tube, and noise is abated. U.S. Pat. No. 4,515,073 discloses a scrubber having a serpentine path in which the air passes through the scrubbing fluid spray several times. A sound absorber is provided within baffles to reduce impact noise. U.S. Pat. No. 4,350,506 discloses a scrubber with a bell-shaped venturi portion that has an enlarged middle and a sound absorber is provided therein. U.S. Pat. No. 4,345,921 discloses a scrubber in which a pair of guide plates is provided in a venturi above the throat to form noise-muffling zones. An impact plate is positioned below the venturi throat and can contain a film or pool of water.

In certain prior-art scrubbers, a portion of the discharge airflow can pass outside the scrubber with little or no mixing with water, and thus can still contain paint particles. Further, the splash of water at a pool can cause contaminated paint overspray treatment fluid drops to be discharged with the air via the exhaust air fan. A device to change the direction of the discharge airflow for the purpose of enhancing the scrubbing of paint particles from a paint mist has been proposed in U.S. Pat. No. 4,704,952, for example. This patent discloses a scrubber having structures through which paint-laden air and water flow downwardly and mix together. Partitions outside the structures cause the air to turn abruptly upwardly and then reverse lateral direction. The air passes through baffles and then is discharged into the atmosphere.

Although the prior art discloses many wet scrubbers, there still remains room for improvement. For example, many state of the art wet scrubbers utilize relatively high pressure systems that result in a large consumption of energy and increased noise. Further, some conventional wet scrubbers still have low efficiency when capturing very small paint particles in the bulk fluid chemical used to treat paint overspray, still present the problem of allowing part of the paint mist to be discharged to the environment, and still permit a large amount of paint-laden bulk fluid drops to be discharged through associated air fan devices to the atmosphere. As a result, more efficacious chemical treatment of the paint overspray, such as that provided by oil/water emulsions is complicated due to volatilization and expulsion of the same, as emissions from the plant into the outside environment. Further, the construction of paint spray booths and the associated wet method treatment system may be unduly complicated thereby complicating manufacturing requirements and raising the associated manufacturing and operating costs.

SUMMARY OF THE INVENTION

The above-referenced concerns are resolved by a paint spray booth employing a wet method and therefore a bulk fluid to treat paint overspray. One or more walls, and typically a plurality of walls, define a paint spray booth or a containment area for painting an article such as a vehicle. A flood plane or flood plane panel is proximate to, adjoined to, or included within the one or more walls of the paint spray booth, and provides an area where bulk fluid is drained from the paint spray booth, or, wherein bulk fluid communicates therewith. A plenum is formed below the flood plane, or at the bottom of the paint spray booth, wherein bulk fluid drains from the flood plane into the plenum during normal operation of the paint spray booth. A contact material is packed or contained within the plenum thereby providing a contact surface for intimate contact and mixing of the bulk fluid and the paint overspray directed into the plenum.

Stated another way, the present invention may be characterized as a paint spray booth including a plenum formed at the bottom thereof, wherein bulk fluid employed during operation of the paint spray booth is directed into the plenum either by drainage or plumbing. A contact material is then packed within the plenum whereby the contact material contains interstitial areas that when combined form a plurality of tortuous paths to provide intimate contact between the bulk fluid and the paint particles/droplets of the paint overspray.

A method of treating paint overspray is therefore provided wherein the method includes the following steps:
provide a bulk fluid for treating the paint overspray;
providing a plenum formed below the paint spray booth for receipt of the bulk fluid during operation of the paint spray booth;
packing a material within the plenum to provide a plurality of surfaces for bulk fluid and paint overspray contact, and, to provide a plurality of tortuous paths for fluid flow through the packed bed; and
directing at least a portion of the paint overspray into the plenum for bulk fluid/paint overspray contact, either directly or via entrainment within the bulk fluid along a fluidized curtain for example.

BRIEF DESCRIPTION OF THE FIGURES

FIG. 2 exemplifies packing or contact material that may be employed in accordance with the present invention.

DETAILED DESCRIPTION OF THE PREFERRED EMBODIMENT

Figure 1:
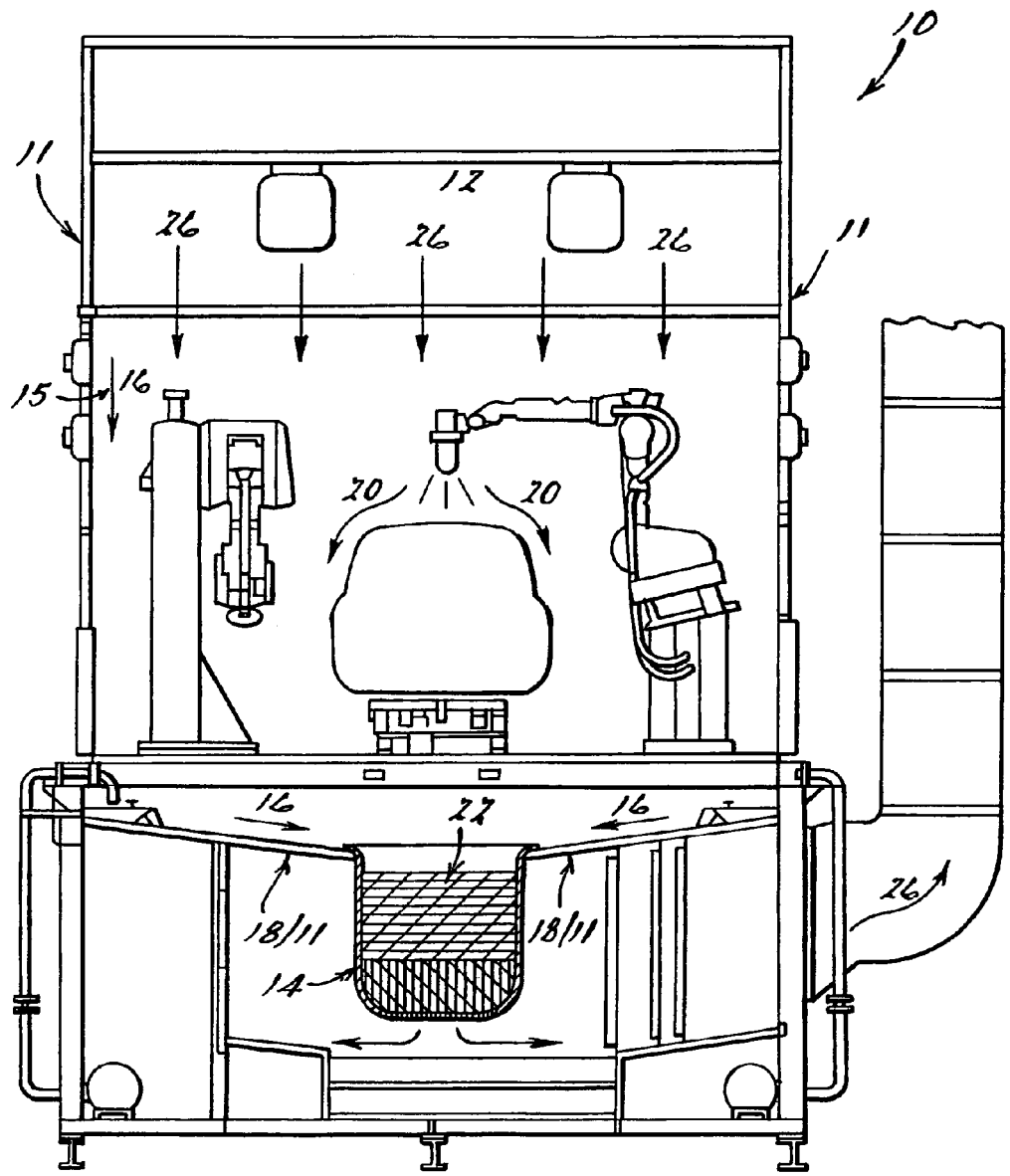
FIG. 1 exemplifies a paint spray booth in accordance with the present invention.

A paint spray booth is constructed as known in the art. For example only, and not by way of limitation, a paint spray booth may be constructed as described in U.S. Pat. Nos. 6,093,250 and 6,024,796, herein incorporated by reference. As such, typical operation of any paint spray booth is contemplated. However, in accordance with the present invention, the treatment of the paint overspray is mechanically modified to result in a reduction in energy, maintenance, equipment, manufacturing, and related paint shop costs.

As shown in U.S. Pat. Nos. 6,093,250 and 6,024,796, the aqueous or fluidized curtain and paint laden air is typically funneled through floor grates at the bottom of the booth. The mixture then proceeds down the flood sheets and through mixing and vortex chambers to facilitate contact between the paint overspray and the aqueous/chemical mixture. It has been found that a chemical treatment bulk fluid employing oil-in-water emulsions or chemical mixtures such as that described in U.S. Pat. No. 4,919,691, also herein incorporated by reference, is quite effective in removing the paint solids from the air and simultaneously inhibiting the buildup of paint solids throughout the paint spray booth, both above and below the floor grates. Fluidized curtains, bulk fluid spray, and the like exemplify how paint overspray may be entrained within the bulk fluid in a known manner. The volatile nature and low density of the oil, when combined with the high pressure of the vortex chamber, however, creates a mist or fog that is often vented through the paint stack if not properly filtered as the mist is vented. Accordingly, although the oil/water emulsion of U.S. Pat. No. 4,919,691, or any equivalent thereof, is a preferred chemical treatment of the paint overspray, there is presently a concern of inhibiting the deposition or collection of the oil mist in areas other than about the paint spray booth.

In accordance with the present invention, it has been discovered that effective treatment of the paint overspray can be accomplished by modifying known paint spray booths to incorporate low pressure mixing and treatment of the bulk fluid and the paint overspray, respectively, rather than the high pressure mixing attendant to the vortex chamber as illustrated in U.S. Pat. Nos. 6,024,796 and 6,093,250. Accordingly, a paint spray booth constructed in accordance with the present invention will incorporate a packed transfer conduit or plenum in place of the vortex chamber or acceleration cone incorporated in U.S. Pat. No. 6,024,796, for example. The packed transfer conduit may be stamped or otherwise formed from metal (or other suitable materials) and is designed with a relatively greater diameter or cross-sectional area than its known counterpart, the acceleration cone or vortex chamber. Additionally, there is preferably no conical shape or reduced diameter from the top of the transfer conduit to the grated bottom. The grated bottom is provided to retain the desired packing media within the cylinder, but in some instances may not be required (e.g. when monolithic packing media is employed). Instead, the plenum preferably features a constant diameter or other cross-sectional area from the top to the bottom of the packed plenum, but is not thereby limited.

Stated another way, a packed plenum replaces the known acceleration cones or venturis of state-of-the-art paint spray booths thereby reducing the high pressure draw and energy needed to create the mixing vortex in the known art. The cylinder may be circular or otherwise geometrically formed across the cross-section. Furthermore, the packed plenum or transfer conduit may be packed with known packing media such as that described, but not thereby limited, in U.S. Pat. Nos. 3,450,393, 6,162,377, and 6,502,807, herein incorporated by reference. Other packing media such as stoneware and ceramic saddles, Berl Saddles, Raaschig Rings, Cross Partition Rings, and Lessing Rings provided by the KIP Company of Cleveland, Ohio, for example. Or, honeycombed spherical packing, rings, saddles, and other packing media may be provided by Jaeger Products, Inc. of Houston, Tex. for example. Or, monolithic packing may be employed if desired. Any packing media exhibiting the desired surface area and desired interstitial area once packed within the plenum, as iteratively determined by pressure drop across the packed plenum, and/or by grains emitted from plant ventilation for example, may be employed. Other exemplary packing includes, but is not limited to, random packing, ceramic balls, high alumina balls, and cross partition packing media.

In operation, a bulk fluid for paint overspray treatment may be preferably charged with a fluid exemplified by U.S. Pat. No. 4,919,691, or with a similar oil-in-water emulsion or composition. Other paint detackification chemistry is also contemplated and may be provided as known in the art. The paint overspray is then routed down through the grates either directly by air flow, or entrained within the bulk fluid, within a fluidized curtain flowing down a wall of the paint spray booth, for example. As the paint and bulk fluid mix within the packed plenum, intimate contact between substantially all of the paint overspray and the bulk fluid is established by virtue of the tortuous paths throughout the packed transfer conduit. Contact efficiency between the paint and the bulk fluid is substantially enhanced by virtue of the low pressure packed transfer conduit. As a result, energy costs associated with high pressure pumps are reduced in lieu of low pressure requirements. Furthermore, maintenance and equipment costs associated with the filtering or collection of airborne oil or mist, and paint deposition are dramatically reduced. As the bulk fluid percolates through the packed bed or plenum, it is then plumbed back to a reservoir in accordance with known design and principles for ultimate reuse in the paint spray booth system. In the same way, as the air forced through the booth (from the top for example) is forced through the packed transfer plenum, paint overspray entrained therein is filtered by the packed material and the bulk fluid. The air is then pumped back through the paint spray booth system in a known manner as shown in FIG. 1.

The packing density of the plenum and the packing chosen may be varied as determined by local design criteria. Accordingly, the total surface area and the total interstitial area defined by the type and amount of packing chosen may be determined on an iterative basis by measuring the pressure drop across the packed plenum and optimizing the amount and type of packing based on design requirements.

It will be appreciated that the packing may be cleaned or replaced as necessary to maintain the bulk fluid and air flow within system design tolerances. One of ordinary skill in the art will also appreciate that the high pressure typically found in venturi systems, for example, is not necessary for optimum paint overspray/bulk fluid contact, particularly in view of the relatively large aggregated surface area of the packed bed and the resultant overspray/bulk fluid contact. Other structures typically associated with paint spray booths may be utilized in conjunction with the packed bed to include mist eliminators and baffle systems, for example. U.S. Pat. No. 4,704,952 exemplifies the use of such structures and is incorporated herein by reference. In essence, the use of the packed plenum combined with other known paint spray booth structure results in the elimination of mist and emissions flowing out of associated ventilation or paint stacks.

In accordance with the present invention, a paint spray booth 10 is exemplied, but not thereby limited, in FIG. 1. One or more walls 11 define the containment area 10 for containment of the painting operation. A paint spray booth 10 may be employed to paint an article such as an automobile while moving along a conveyor line passing through the working area of the booth 10. Air 26 is typically moved or directed from an area 12 above the article downwardly around the article for discharge into and through a plenum 14 positioned along a center line of the booth 10, for example. Other configurations may be utilized wherein more than one packed plenum 14 is employed within the booth 10. Accordingly, another configuration (not shown) within an automotive paint spray booth 10 might, for example, include a pair of packed plenums 14a, 14b wherein each plenum 14 is located beneath each respective rocker panel. As such, at least one packed plenum 14 may be employed in a paint spray booth 10 of the present invention. In any design, bulk fluid 16 is supplied to a pan or flood plane or flood plane panel(s) 18 positioned beneath the article or vehicle whereby the bulk fluid 16 cascades downward into the plenum(s) 14, in fluid communication therewith. Concurrently therewith, paint overspray 20 may be directly carried onto the pan(s) 18 by forced air 26 and then into plenum 14 for contact with material 22 and for mixing with bulk fluid 16. Alternatively, or at the same time, paint overspray 20 may also be entrained within bulk fluid 16 in a known manner (exemplified by a fluidized curtain 15) and then supplied to pan(s) 18 whereby the bulk fluid 16 is then drained into plenum 14 and about packing 22. Contact material 22 is packed in a density determined, iteratively or otherwise, by the respective design criteria of the particular painting operation and the bulk fluid paint overspray treatment system.

FIG. 2 illustrates various types of packing or contact material 22, and various shapes of packing 22 thereby enabling tailoring of the total surface area and of the total interstitial area defined by the packing 22 within the packed plenum 14. In general, the packing 22 is preferably non-sorbent or moderately sorbent thereby inhibiting saturation of the packing with the bulk fluid 16 employed.

One or more benefits may be associated with the present invention, depending on the specific application. For example, it has been found that chemical stability of the bulk fluid with an increased amount of solids is enhanced. Further, other benefits include: reduced energy costs due to a reduction in pressure across the plenum as compared to venturi systems; reduced filter costs; reduced water loss due to reduced evaporation; reduced maintenance or booth cleaning costs due to more efficient treatment of the paint overspray; and other cost improvements. Accordingly, paint spray booths incorporating the packed plenum of the present invention will typically observe one or more of the benefits stated.

Preliminary prototype testing indicates an average drop of 1.0" W.C. and 500 FPM face velocity. The test was conducted using 40 gallons of high solids of automotive topcoat paint which was sprayed into the air stream to evaluate particulate removal. The test was conducted over a three-hour period with no increase in static pressure. Particulate emission appears to be well below the current automotive standards, ranging from 0 to 0.5 grains.

It will be understood that the foregoing description of the preferred embodiment of the present invention is for illustrative purposes only. As such, the various structural and operational features herein disclosed are susceptible to a number of modifications commensurate with the abilities of one of ordinary skill in the art, none of which departs from the scope of the present invention as described above and as stated in the claims appended hereto.

What is claimed is:

1. A paint spray booth employing a bulk fluid to treat paint overspray, said paint spray booth comprising:
   one or more walls defining a containment area for painting an article;
   a flood plane panel proximate to or included within said one or more walls;
      wherein during operation of said paint spray booth said bulk fluid fluidly communicates with said flood plane panel;
   at least one plenum formed below said flood plane panel and in fluid communication therewith, wherein during operation of said paint spray booth said bulk fluid flows into said at least one plenum; and
   a contact material contained within each of said at least one plenum thereby providing a contact surface for bulk fluid and paint overspray mixing.

2. The paint spray booth of claim 1 wherein said bulk fluid comprises an oil-in-water emulsion.

3. The paint spray booth of claim 1 wherein said contact material may be selected from ceramic saddles, ceramic spheres, cross-partition media, monolithic packing, raaschig rings, lessing rings, and other packing media.

4. A method of treating paint overspray within a paint spray booth, the method comprising the steps of:
   providing a bulk fluid for treating the paint overspray;
   providing at least one plenum formed below the paint spray booth for receipt of the bulk fluid during operation of the paint spray booth;
   packing a material within each of the at least one plenum to provide a plurality of surfaces and a plurality of tortuous paths for bulk fluid/paint overspray contact; and
   directing at least a portion of the paint overspray into the at least one plenum for bulk fluid/paint overspray contact.

5. The method of claim 4 wherein directing at least a portion of the paint overspray into the at least one plenum comprises directing neat paint overspray into the at least one plenum by forced air.

6. The method of claim 4 wherein directing at least a portion of the paint overspray into the plenum comprises directing paint overspray entrained within the bulk fluid into the at least one plenum.

7. A paint spray booth comprising a bottom and employing a bulk fluid for paint overspray treatment, said paint spray booth further comprising:
   at least one plenum formed at said bottom of said paint spray booth, wherein said plenum fluidly communicates with said bulk fluid and paint overspray upon paint spray booth operation; and
   a contact material packed within each of said at least one plenum whereby said contact material creates a plurality of tortuous paths to provide intimate contact between said bulk fluid and said paint overspray.

8. The paint spray booth of claim 7 wherein said bulk fluid comprises an oil-in-water emulsion.

9. The paint spray booth of claim 7 wherein said bulk fluid communicates with said at least one plenum as directed from a fluidized curtain draining into said plenum.

10. The paint spray booth of claim 7 wherein said contact material may be selected from ceramic saddles, ceramic spheres, cross-partition media, monolithic packing, raaschig rings, lessing rings, and other packing media.

* * * * *